United States Patent
Ferguson et al.

(10) Patent No.: US 7,967,252 B2
(45) Date of Patent: *Jun. 28, 2011

(54) FAIRING AND AIRFOIL APPARATUS AND METHOD

(75) Inventors: Stanley D. Ferguson, Renton, WA (US); William W. Herling, Bellevue, WA (US); David A. Treiber, Seattle, WA (US)

(73) Assignee: The Boeing Company, Chicago, IL (US)

( * ) Notice: Subject to any disclaimer, the term of this patent is extended or adjusted under 35 U.S.C. 154(b) by 474 days.

This patent is subject to a terminal disclaimer.

(21) Appl. No.: 12/128,123

(22) Filed: May 28, 2008

(65) Prior Publication Data

US 2009/0321572 A1    Dec. 31, 2009

Related U.S. Application Data

(63) Continuation-in-part of application No. 11/014,582, filed on Dec. 16, 2004, now abandoned.

(51) Int. Cl.
*B64C 3/16* (2006.01)
*B64C 1/18* (2006.01)

(52) U.S. Cl. ............. 244/123.1; 244/130; 244/121; 244/200

(58) Field of Classification Search ............ 244/123.1, 244/123.13, 123.14, 130, 199.1, 204, 200, 244/200.1, 119, 120, 121, 117 R; D12/319, D12/345; 343/705, 708
See application file for complete search history.

(56) References Cited

U.S. PATENT DOCUMENTS

| | | | | |
|---|---|---|---|---|
| 2,612,606 A * | 9/1952 | Wehner | ............ | 343/708 |
| 2,755,216 A * | 7/1956 | Lemons | ............ | 156/155 |
| 2,873,931 A * | 2/1959 | Fleischmann | ............ | 244/200 |
| 3,002,190 A * | 9/1961 | Oleesky et al. | ............ | 343/907 |
| 3,463,418 A * | 8/1969 | Miksch | ............ | 244/200.1 |
| 3,604,661 A * | 9/1971 | Mayer, Jr. | ............ | 244/207 |
| 4,189,120 A * | 2/1980 | Wang | ............ | 244/214 |
| 4,318,328 A * | 3/1982 | Rona | ............ | 89/1.815 |
| 4,365,574 A * | 12/1982 | Norminton | ............ | 114/243 |
| 4,458,936 A * | 7/1984 | Mulholland | ............ | 296/180.4 |
| 4,661,821 A * | 4/1987 | Smith | ............ | 343/743 |
| 4,867,394 A * | 9/1989 | Patterson, Jr. | ............ | 244/54 |
| 4,878,062 A * | 10/1989 | Craven et al. | ............ | 343/872 |
| 5,093,313 A * | 3/1992 | Minovitch | ............ | 505/164 |
| 5,209,434 A * | 5/1993 | Lo Presti et al. | ............ | 244/130 |

(Continued)

OTHER PUBLICATIONS

Lednicer, David, "The Incomplete Guide to Airfoil Usage," Apr. 5, 2005, http://www.ae.uiuc.edu/m-selig/ads/aircraft.html.

(Continued)

*Primary Examiner* — Joshua J Michener
(74) *Attorney, Agent, or Firm* — Harness, Dickey & Pierce, P.L.C.

(57) ABSTRACT

An airfoil for use on a high speed, jet powered airborne mobile platform and secured to an exterior surface of said mobile platform at a location so as to be disposed within a boundary layer during flight of the mobile platform. The airfoil produces a peak Mach number for airflow over a longitudinal centerline of said airfoil that is no greater than about Mach 1.2 when said mobile platform is moving at a speed of about Mach 0.85 with a relative constant Mach number flow over a region defined as at least an approximate 20% length of maximum thickness of said airfoil. The airfoil also has a pressure distribution (Cp) that is positive at a trailing edge thereof.

19 Claims, 15 Drawing Sheets

U.S. PATENT DOCUMENTS

| | | | | |
|---|---|---|---|---|
| 5,216,435 A * | 6/1993 | Hirata et al. | | 343/853 |
| D344,489 S * | 2/1994 | Webb | | D12/345 |
| 5,458,299 A * | 10/1995 | Collins et al. | | 244/134 C |
| 5,689,276 A * | 11/1997 | Uematsu et al. | | 343/872 |
| 5,692,709 A * | 12/1997 | Mihora et al. | | 244/204 |
| 5,805,111 A * | 9/1998 | Brettner et al. | | 342/455 |
| 5,986,611 A * | 11/1999 | Harrison et al. | | 343/705 |
| D432,073 S * | 10/2000 | Coyle | | D12/345 |
| 6,204,820 B1 * | 3/2001 | Jensen, Jr. | | 343/713 |
| 6,570,540 B2 * | 5/2003 | Desargant et al. | | 343/705 |
| 6,608,596 B2 * | 8/2003 | Bien et al. | | 343/705 |
| 6,751,442 B1 * | 6/2004 | Barrett | | 455/11.1 |
| D497,586 S * | 10/2004 | Ferguson | | D12/345 |
| 6,814,474 B2 * | 11/2004 | Groeller | | 362/485 |
| 6,831,610 B2 * | 12/2004 | Quagliaro | | 343/705 |
| 6,844,856 B1 * | 1/2005 | Wright | | 343/705 |
| 6,856,295 B2 * | 2/2005 | Desargant et al. | | 343/705 |
| 6,992,640 B2 * | 1/2006 | Usami et al. | | 343/872 |
| 7,123,199 B2 * | 10/2006 | Rotta | | 343/708 |
| 2003/0052829 A1 * | 3/2003 | Desargant et al. | | 343/705 |
| 2003/0142024 A1 * | 7/2003 | Carson | | 343/705 |

OTHER PUBLICATIONS

Appendix III, http://web.archive.org/web/20020621082045/http://pdas.com/sections45.htm.

Airfoil Geometry, http://web.archive.org/web/19991103040416/http://www.desktopaero.com/appliedaero/airfoils1/airfoilgeometry.html.

* cited by examiner

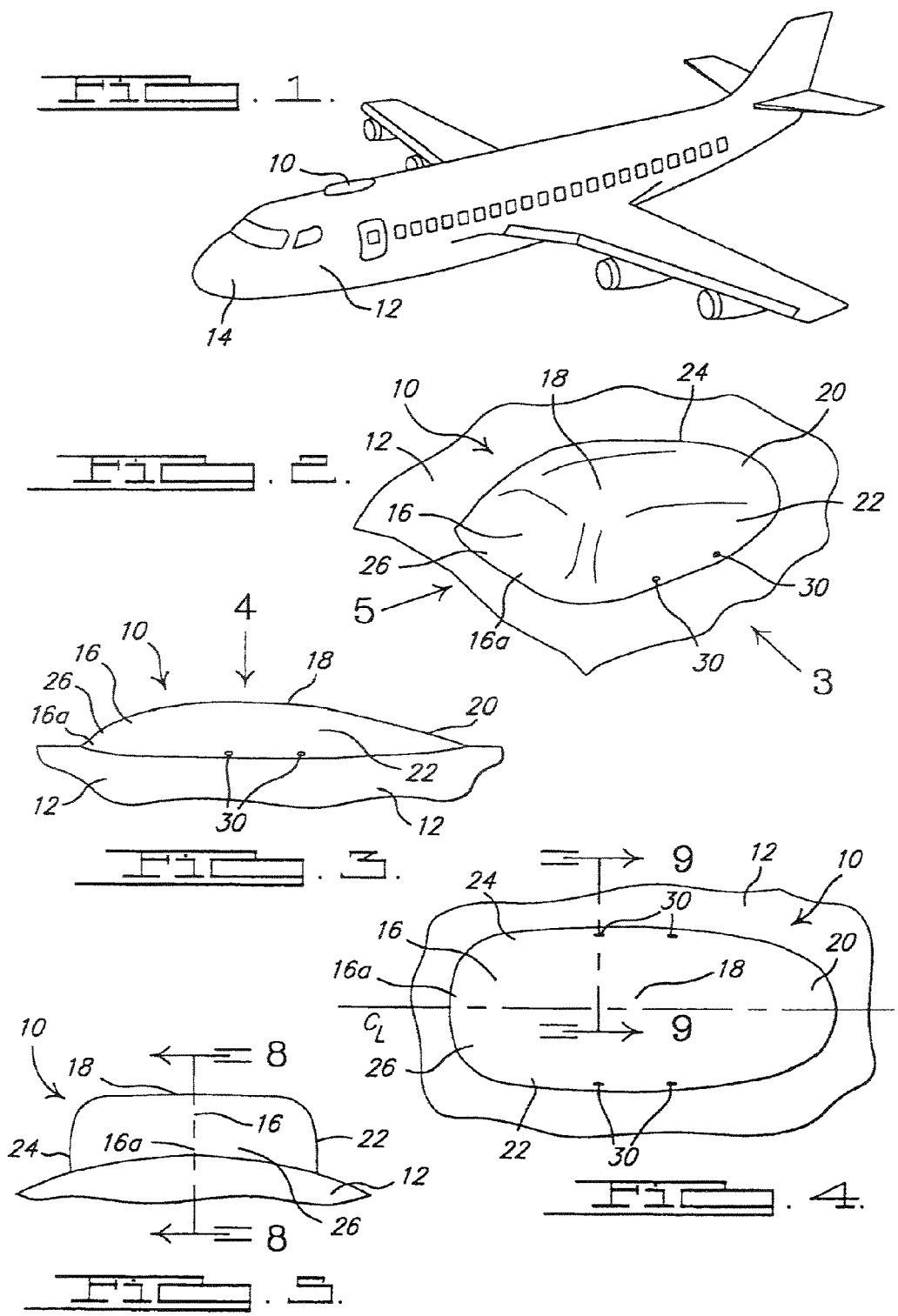

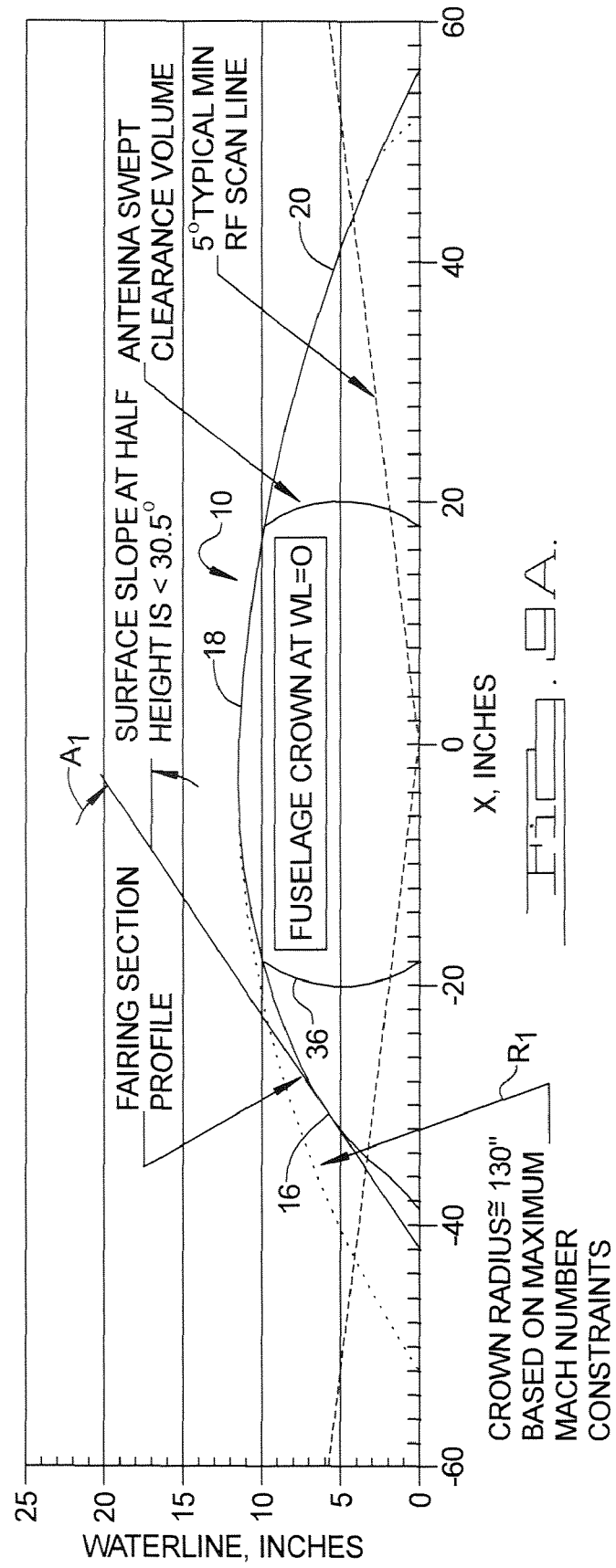

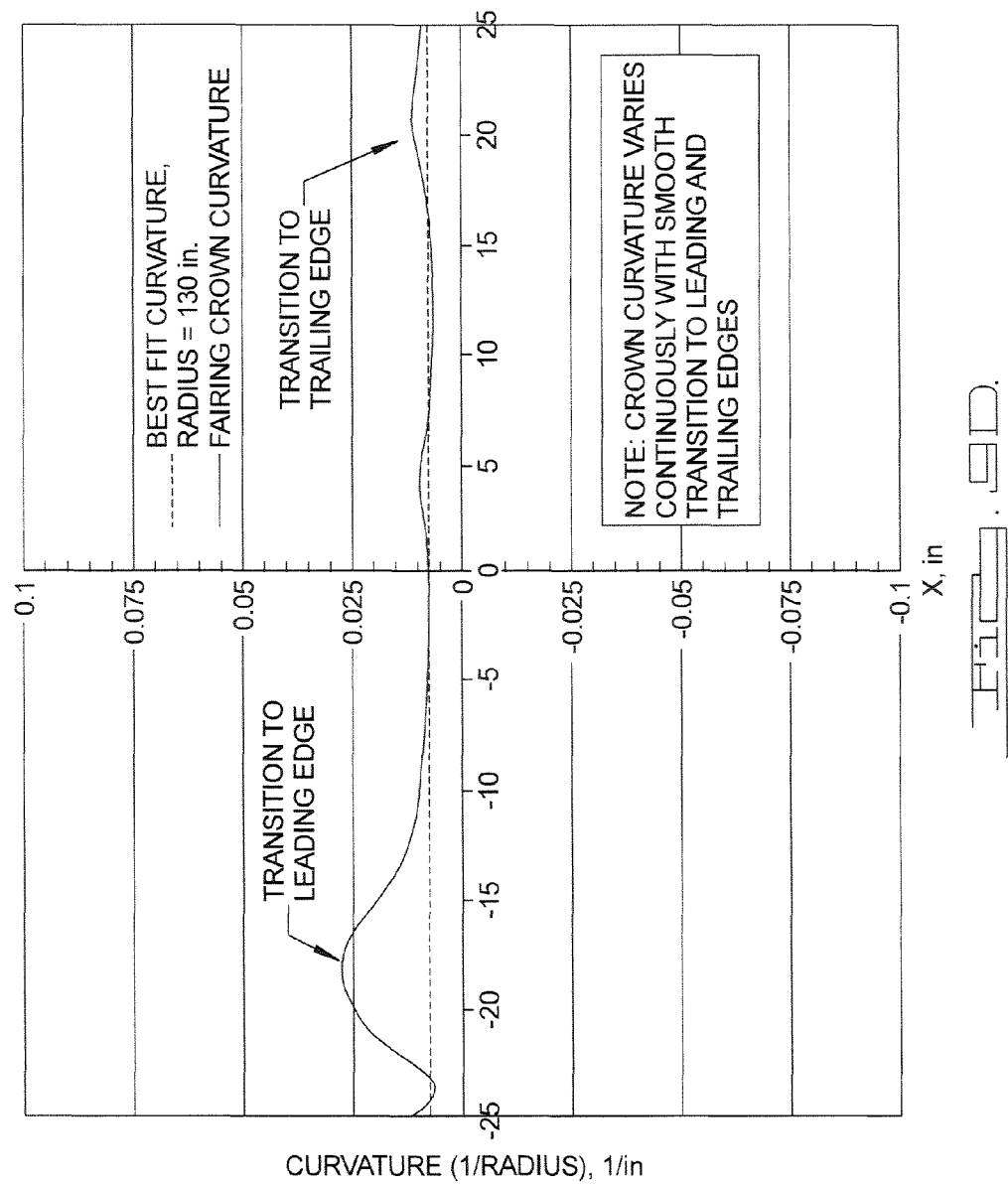

FAIRING AND AIRFOIL APPARATUS AND METHOD

PRIORITY INFORMATION

The present application is a continuation-in-part of U.S. application Ser. No. 11/014,582 filed Dec. 16, 2004, which claims priority from U.S. provisional application Ser. No. 60/537,447, filed Jan. 16, 2004, entitled "Antenna Fairing and Method", the entire contents of which are incorporated by reference herein.

FIELD

The present system and method generally relates to airfoils and fairings, and more particularly to a highly aerodynamic airfoil for use on a high speed mobile platform.

BACKGROUND

Mobile platforms such as aircraft, busses, trains, ships, rotorcraft, etc., typically require an externally mounted antenna to enable communications with a base station transceiver. In an aircraft application, the antenna would typically be mounted on an exterior surface of the fuselage on the crown of the fuselage. For example, the CONNEXION BY BOEING$^{SM}$ system enables high speed transmission of digital information from a base transceiver directly to high speed mobile platforms such as (but not limited to) commercial jet aircraft, or via a transponded satellite communications link.

With any mobile platform, aerodynamics is typically an important consideration. With high speed moving aircraft such as commercial jet aircraft, aerodynamics becomes an especially important consideration in the performance of the aircraft and its operating costs. However, with any form of airborne mobile platform, the mounting of an antenna on an external surface thereof will generally operate to negatively affect the aerodynamics of the mobile platform. To protect the antenna and to further mitigate the negative aerodynamic impact of the antenna, a fairing (also referred to as a "radome") may be mounted over the antenna to enclose the antenna over a portion of an exterior surface of the mobile platform. In this instance, the shape of the fairing is important to providing good aerodynamic performance, and therefore ameliorating the negative aerodynamic influence that would otherwise be introduced by the presence of the antenna on the exterior surface of the mobile platform.

Present day fairings, however, are not especially well suited (i.e., shaped) to cover antennas having dimensions required for use with high frequency, satellite based communication systems. Such antennas often project up to 12 inches (30.48 cm) or more above the outer surface of the mobile platform upon which they are mounted, and therefore present a significant "protrusion" or projection that can negatively affect the aerodynamic performance and operational cost of a high speed mobile platform.

When an airfoil is employed on a high speed mobile platform, similar aerodynamic considerations must be considered. For example, the airfoil should have a curvature that avoids shocks at the peak MACH speed that the mobile platform will experience. This requires the local MACH speeds of airflow over various portions of the airfoil to remain at or below about 1.2 MACH. The airfoil should not have significant unstable flow characteristic, i.e., flow separation at the aircraft cruise flight speed, which can shorten the life of the structural hardware due to fatigue damage.

SUMMARY

In one aspect the present disclosure relates to an airfoil for use on a high speed, jet powered airborne mobile platform, and secured to an exterior surface of said mobile platform at a location so as to be disposed within a boundary layer during flight of the mobile platform, the airfoil may include: a chord length designated by X; a chord thickness at a local center line representing a thickness designated by Z; wherein one-half of a thickness (Z) of the chord forms a ratio (Z/X) approximately within a range of about 11-13%; the airfoil producing a peak Mach number for airflow over a longitudinal centerline of the airfoil that is no greater than about Mach 1.2 when the mobile platform is moving at a speed of about Mach 0.85 with a relative constant Mach number flow over a region defined as at least an approximate 20% length of maximum thickness of the airfoil; the airfoil further having a drag coefficient that is relatively constant and less than a value of about 0.10 up to an airspeed of about Mach 0.9; the airfoil further having a pressure distribution (Cp) that is positive at a trailing edge; and the airfoil further having a frontal portion forming an angle at a half height point thereof of between about 20 degrees to about 32 degrees relative to the exterior surface of the mobile platform.

In another aspect an airfoil is disclosed for use on a high speed jet aircraft, and is secured to an exterior surface of said aircraft at a location so as to be within a boundary layer while the aircraft is in flight. The airfoil may include: a chord length designated by X; a chord thickness at a local center line representing a thickness designated by Z; wherein one-half of a thickness (Z) of the chord forms a ratio (Z/X) approximately within a range of about 11-13%; wherein the airfoil includes a frontal portion, the frontal portion including a fillet and a generally bull nose shape; the airfoil producing a peak Mach number for airflow over a longitudinal centerline of said airfoil of no more than about 1.2 over an operating speed of about Mach 0.41-Mach 0.85, with a relatively constant Mach number for airflow over a region defining the thickest 20% of the airfoil, and with no abrupt change from supersonic to subsonic flow that would result in formation of a shock wave; the airfoil further having a drag coefficient that is relatively constant and less than a value of about 0.10 up to an airspeed of about Mach 0.9; the airfoil further having a tapering rear portion and a pressure distribution (Cp) that is positive at the tapering rear portion; the frontal portion forming a leading edge surface for the airfoil, the frontal portion forming an angle at a half height point thereof between about 30 degrees to about 31 degrees; and the top portion and the tapering rear portion forming a radius of curvature that is between about 125 inches-135 inches.

In another aspect the present disclosure relates to an airfoil for use on a high speed jet aircraft which is secured to an exterior surface of the aircraft at a location so as to be within a boundary layer while the aircraft is in flight. The airfoil may comprise: a chord length designated by X; a chord thickness at a local center line representing a thickness designated by Z; wherein one-half of a thickness (Z) of the chord forms a ratio (Z/X) approximately within a range of about 11-13%; wherein the airfoil includes a frontal portion, the frontal portion including a fillet and a generally bull nose shape; the airfoil producing a peak Mach number for airflow over a longitudinal centerline of said airflow of no more than about 1.2 over an operating speed of about Mach 0.41-Mach 0.85, with a relatively constant Mach number for airflow over a region defining the thickest 20% of the airfoil, and with no abrupt change from supersonic to subsonic flow that would result in formation of a shock wave; the airfoil further having a drag coefficient that is relatively constant and less than a value of about 0.10 up to an airspeed of about Mach 0.9; the airfoil further having a tapering rear portion and a pressure distribution (Cp) that is positive at said tapering rear portion; the frontal portion forming a leading edge surface for the airfoil, the frontal portion forming an angle at a half height point thereof between about 30 degrees to about 31 degrees; and the top portion and the tapering rear portion forming a radius of curvature that is between about 125 inches-135 inches.

The features, functions, and advantages can be achieved independently in various embodiments of the present system or may be combined in yet other embodiments.

BRIEF DESCRIPTION OF THE DRAWINGS

The present system will become more fully understood from the detailed description and the accompanying drawings, wherein:

FIG. 1 is a simplified view of an aircraft incorporating a fairing of the present system thereon;

FIG. 2 is an enlarged prospective front/side view of the fairing of FIG. 1;

FIG. 3 is a side view of the fairing taken in accordance with directional arrow 3 in FIG. 2;

FIG. 4 is a plan view of the fairing of FIG. 3 taken in accordance with directional arrow 4 in FIG. 3;

FIG. 9A is an illustration of the fairing in accordance with section line 8-8 in FIG. 5, which is used to help explain the various dimensions and curvatures of the fairing;

FIG. 9D illustrates a graph showing the smooth variation in crown curvature from the leading to trailing edges of the fairing;

FIG. 9E is a partial cross section of the fairing in accordance with section line 9E-9E in FIG. 4 showing the lateral curvatures of the fairing;

DETAILED DESCRIPTION

Figure 6:
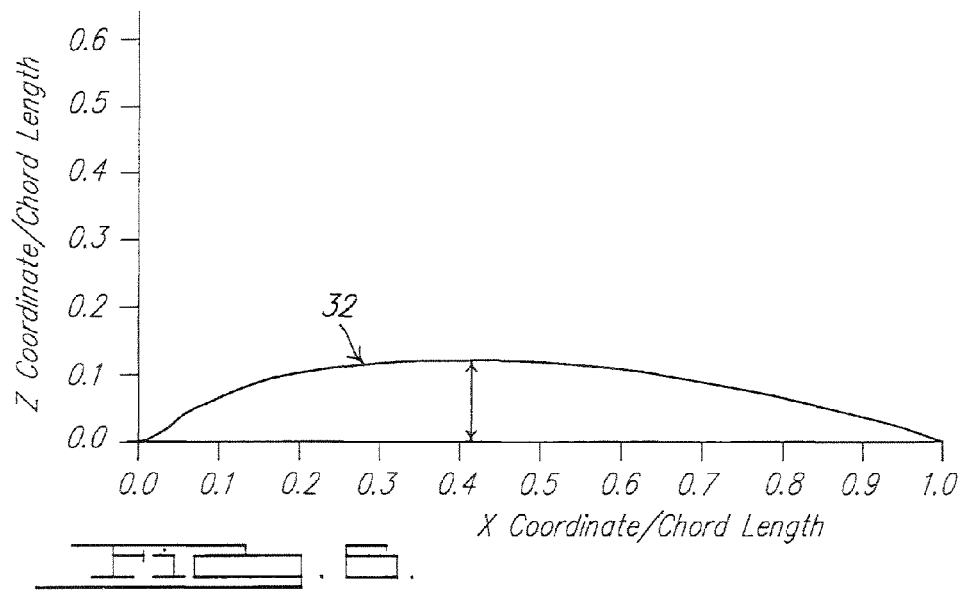
FIG. 6 is a side view graph illustrating the airfoil shape that is used to form the fairing of FIGS. 1-5.

The following description of the various embodiments is merely exemplary in nature and is in no way intended to limit the system, its application, or uses.

Referring to FIG. 1, there is shown a fairing 10 in accordance with one embodiment of the present disclosure. The fairing 10 in this example essentially forms one half of an airfoil that provides a unique aerodynamic shape that operates to avoid significant flow separation at high Mach speeds. In this example the fairing 10 is illustrated as being disposed on an outer surface of a fuselage 12 of a mobile platform 14, which in this example is illustrated as a jet aircraft. It will be appreciated that the fairing 10 can be readily used with virtually any mobile platform where it is important to enclose some component mounted on an exterior surface of the mobile platform so that the negative aerodynamic affects of the component can be minimized. As can be appreciated, with high speed mobile platforms such as aircraft, rotorcraft, space vehicles and high speed land vehicles, the aerodynamic performance of the mobile platform can be an important consideration. The fairing 10 serves to ameliorate the negative aerodynamic effects that would otherwise be introduced by a non-aerodynamically shaped component mounted on an exterior surface of the mobile platform. The fairing 10 also prevents separation of the airflow flowing over the fairing 10 that could produce shocks perceptible to occupants within the mobile platform 14.

With reference to FIGS. 2-5, the fairing 10 can be seen in greater detail. The fairing 10 includes a frontal portion 16, a top or upper portion 18, a tapering rear portion 20, and gradually curving side portions 22 and 24 on opposite sides of the top portion 18. In FIG. 3, the frontal portion 16 can be seen to include a small fillet 26. Fillet 26 helps to reduce or eliminate the stagnation region at a leading edge 16a of the frontal portion 16. As will be appreciated, the presence of a stagnation region is undesirable. Fillet 26 helps to reduce or eliminate the presence of such a region and to insure that airflow moves smoothly over the fairing 10 as the mobile platform 14 is traveling at moderate to high Mach speeds, typically from 0.70 Mach to about 0.90 Mach).

With further reference to FIGS. 2-5, the fairing 10 further preferably includes a pair of vents 30 on each of the side portions 22 and 24. Vents 30 are further preferably formed close to the area of intersection of side portions 22 and 24 and the outer surface 28 of the mobile platform 14. While four vents 30 are shown, it will be appreciated that a greater or lesser number of such vents could be incorporated. The vents 30 serve to equalize the pressure on interior and exterior surfaces of the fairing. The vents 30 are shown as circular shaped vents, however other shapes such as, for example, rectangular or square shaped vents, could also be employed. In one form the vents 30 define circular openings of about 0.375 inch (9.525 mm) each in diameter.

It will be appreciated that in some applications the vents 30 may not be needed. However, if the fairing 10 is incorporated on an airborne mobile platform such as a jet aircraft, then it is preferred to include the vents because pressure equalization on the fairing 10 will be desired during climb and descent phases of flight of the aircraft.

The fairing 10 can be used to enclose any component that is not itself aerodynamically shaped, that would otherwise introduce more than insignificant drag on a mobile platform during its operation. The fairing 10, in one implementation, is used to enclose an antenna and to provide sufficient clearance to allow the antenna to be rotated without interference from any portion of the fairing 10. The fairing 10 is preferably manufactured from a lightweight structural material compatible with its intended use, e.g., transparent to radio frequency transmission such as glass or quartz, either in solid laminate or composite form. Other suitable materials could also be employed.

Referring to FIG. 6, a graph is presented illustrating the thickness-to-length ratio of an airfoil shape 32 that is used to form the fairing 10. Essentially, airfoil shape 32 is scaled as needed in its x, y and z directions to provide an enclosure sufficient to house the component over which the fairing 10 is secured. In one preferred form the airfoil shape 32 has a thickness ratio of preferably about 12%.

Figure 7:
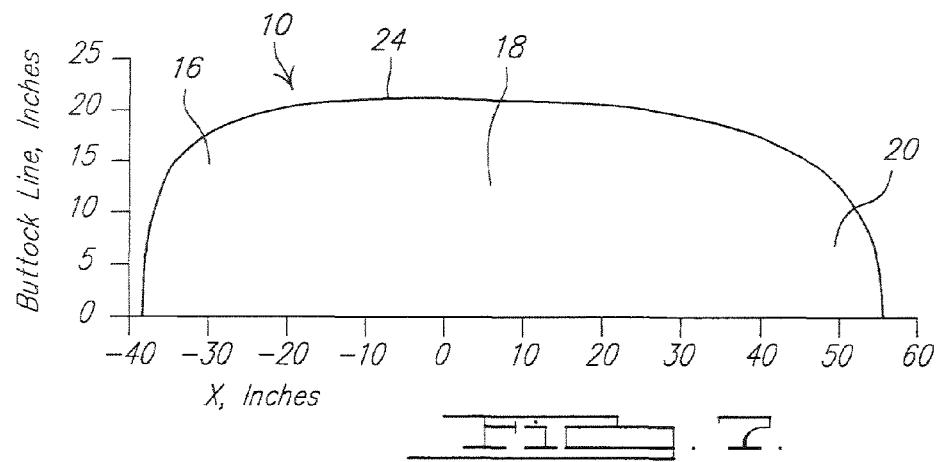
FIG. 7 is a plan view of one-half of the airfoil that is being used to form the fairing of FIG. 2.

Referring to FIG. 7, a graph illustrating one half of the fairing 10 in plan form can be seen. In this example, the overall chord-wise length (X) of the fairing 10 is preferably between about 90-100 inches (228-254 cm), and more preferably about 94 inches (238.76 centimeters). The maximum buttock length from the longitudinal centerline of the fairing 10 is about 21 inches (53.34 centimeters). The maximum overall buttock length, in this example, is about 42 inches (106.68 cm).

Figure 8:
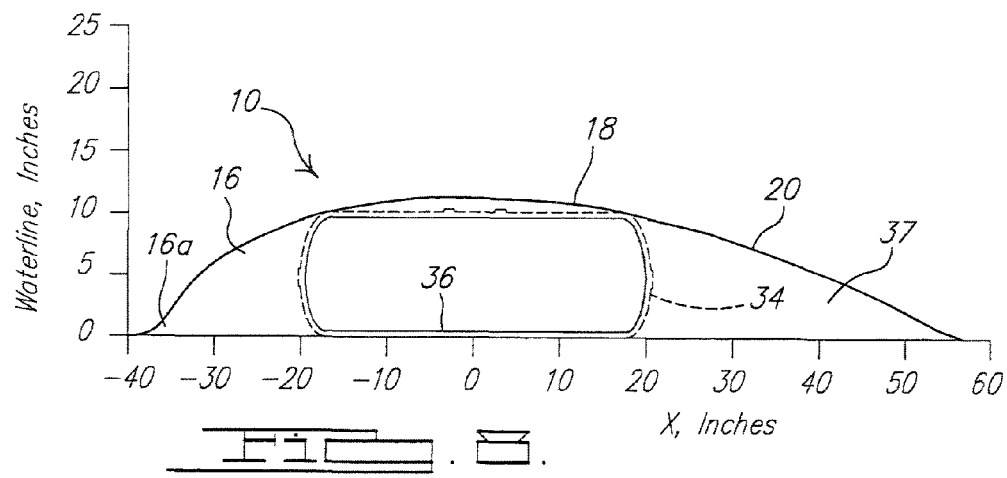
FIG. 8 is a graph illustrating the thickness and length of the fairing in accordance with section line 8-8 in FIG. 5.

Referring to FIG. 8, a graph illustrating the fairing 10 in relation to an envelope 34 can be seen. The envelope 34 defines that space required for enabling movement of a scannable antenna 36 within an interior area 37 of the fairing 10, where the antenna may have dimensions of about typically about inches by 39 inches in swept diameter by about 9.5 inches high (99 cm by 241.3 cm). The antenna in this example can be scanned in both azimuth and elevation to optimally track external signal devices (such as orbiting satellites).

In this example the fairing 10 has an overall height maximum height of about 12 inches (30.48 cm). It will be appreciated that the fairing 10 can be scaled in accordance with the basic airfoil shape 32 shown in FIG. 6 to accommodate larger or smaller electronic components mounted thereunder.

Figure 9:
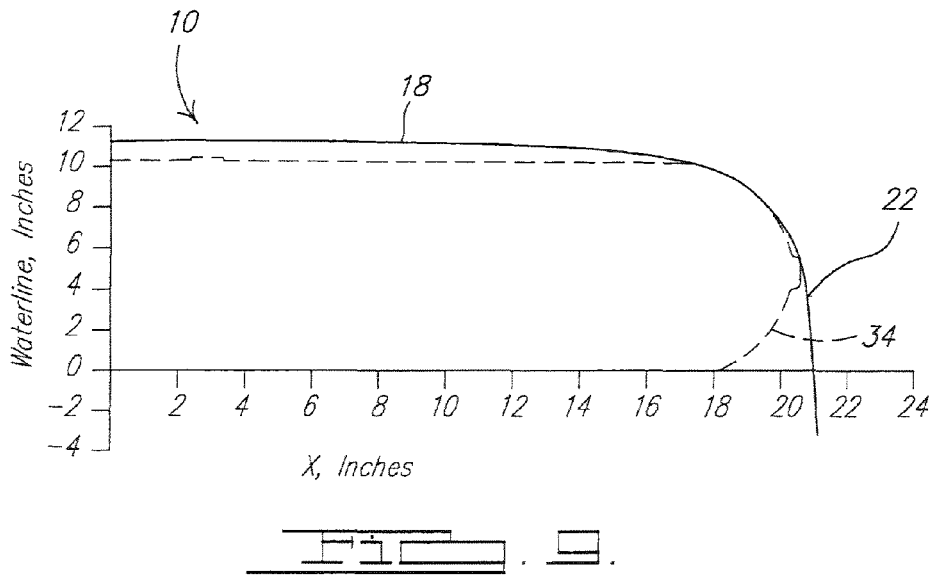
FIG. 9 is a front view graph illustrating a profile of one half of the fairing.
Figure 9B:
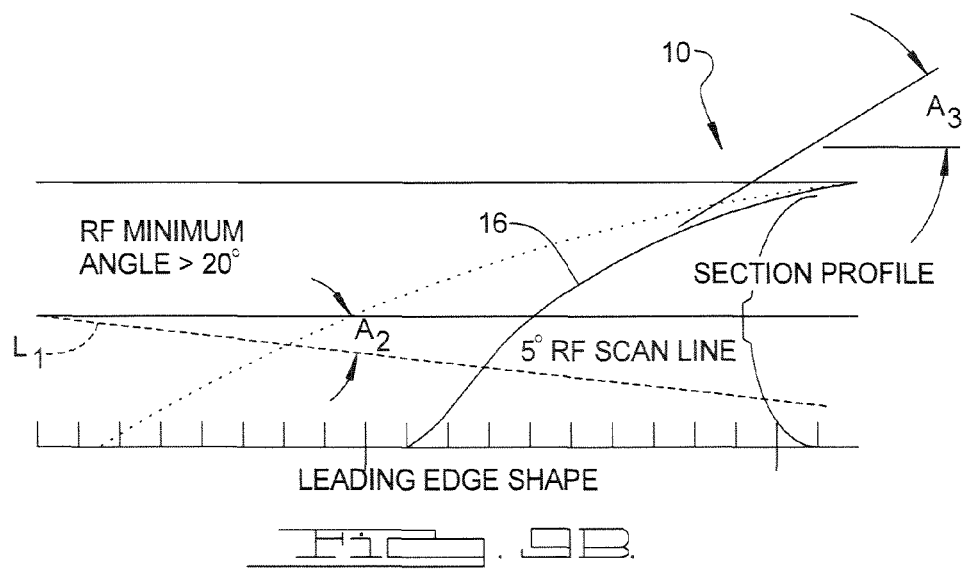
FIG. 9B illustrates the RF minimum grazing angle that the leading edge of the fairing provides, for an antenna positioned underneath the fairing.
Figure 9C:
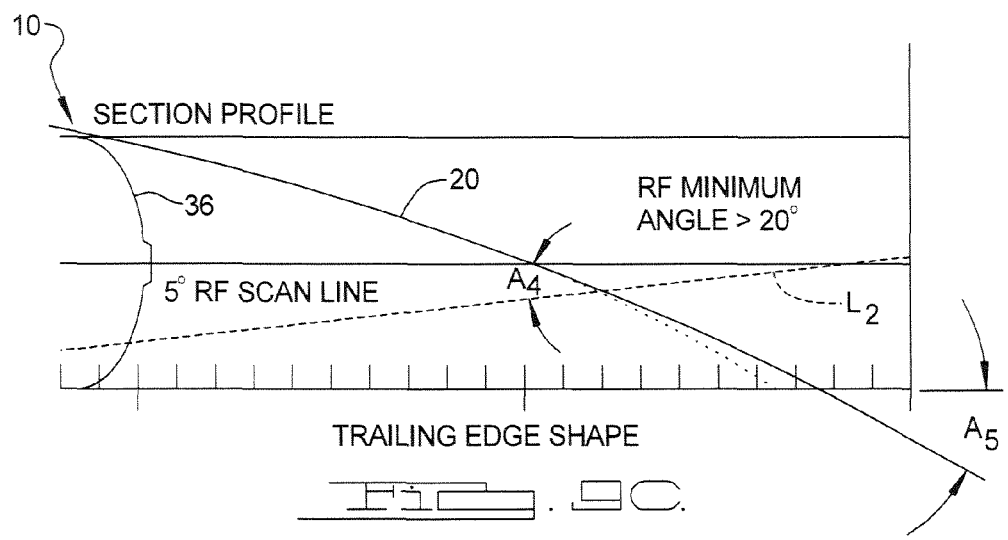
FIG. 9C illustrates the RF minimum grazing angle at the trailing edge of the fairing.
Figure 5E:
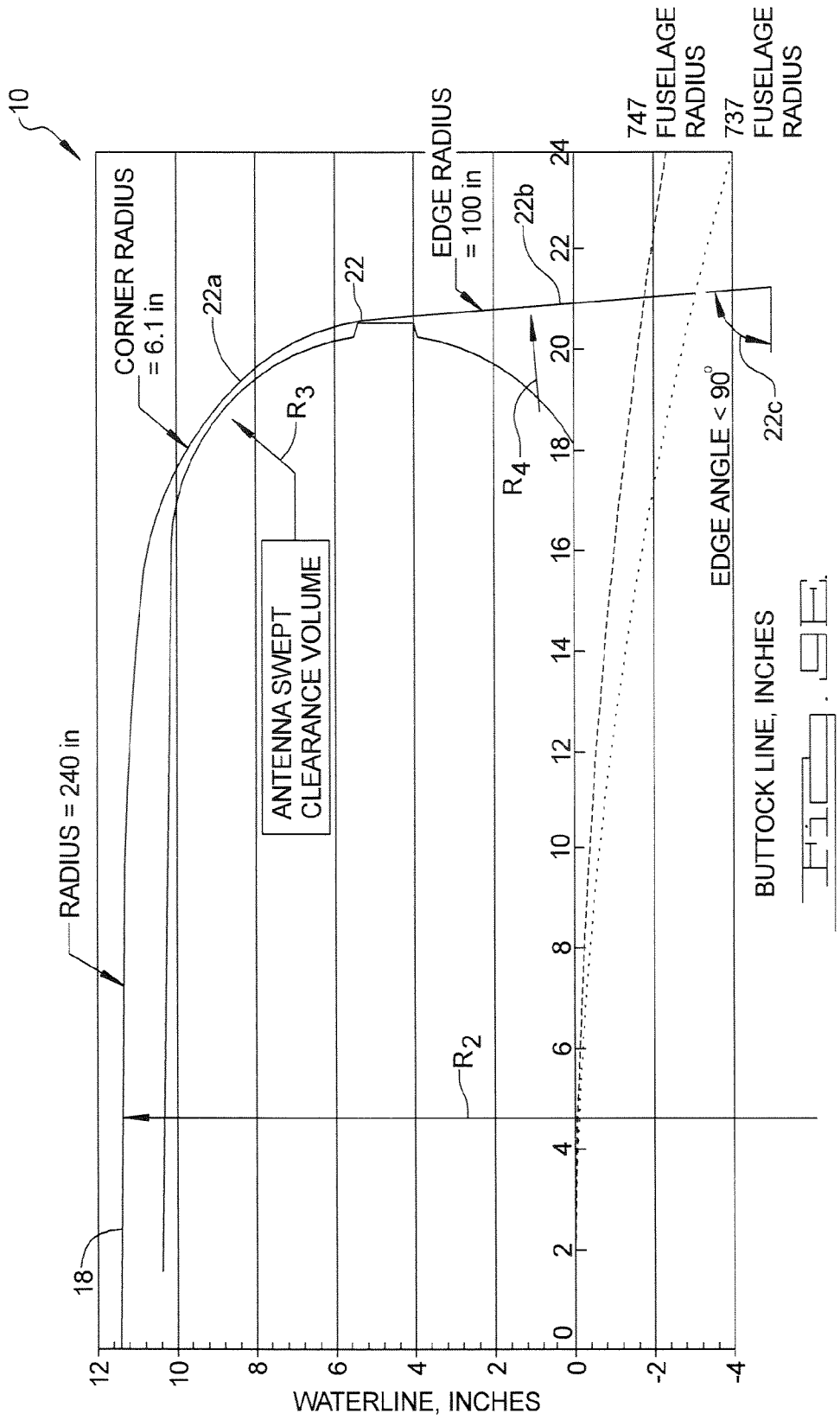
FIG. 5 is a front view of the fairing taken in accordance with directional arrow 5 in FIG. 2.

FIG. 9 illustrates the contour of one of the side portions 22 of the fairing 10. FIGS. 9A-9C illustrate additional, enlarged views of the fairing 10 from different perspectives. In FIG. 9A, for convenience, dimensional notations have been added to indicate the positioning of the fairing 10 relative to the axial (i.e., rotational) center of the antenna 36, which is at 0 inch on the X-axis. In this example the fore-to-aft radius of curvature R1 of the fairing 10 is approximately 130 inches (330.2 cm). The exact radius of curvature is selected in accordance with the maximum operating Mach number of the aircraft on which the fairing 10 will be used to avoid trailing edge flow separation.

In FIG. 9A, at the half height point of the fairing 10, which in this example is about 6 inches (15.24 cm), a line tangent drawn tangent to the frontal portion 16 at the half height point makes an angle $A_1$ of between about 20-32 degrees, and more preferably between about 30-31 degrees, and still more preferably about 30.5 degrees, relative to the fuselage 12 of the aircraft. The frontal portion angle $A_1$ at the half height point of the fairing 10 (i.e., at about the 6 inch mark) is selected in part based on the desired structural strength needed for airworthiness, in part for handling discrete impact loads (e.g., bird strikes), and in part for RF performance of the antenna 36 while the antenna is scanning at low elevation angles (i.e., at low elevation angles where the antenna beam is directed close to the fuselage 12).

Referring to FIGS. 9B and 9C, the above-described fore-to-aft curvatures of the fairing 10 enable an RF minimum angle $A_2$ of about 20 degrees to be achieved when the antenna 36 is oriented to generate a RF scan line $L_1$ (FIG. 9B) at about 5 degrees elevation, and is directing a beam through the frontal portion 16. The structural maximum angle for surface slope of the frontal portion 16 is preferably about 30.5 degrees at the half height of the frontal portion 16, as indicated by angle $A_3$. In FIG. 9C, the radius of curvature of about 130 inches for the top portion 18 and tapering rear portion 20 enables an RF minimum angle $A_4$ of about 20 degrees to be achieved when the antenna 36 is aimed to generate an RF scan line at about 5 degrees elevation, as indicated by line $L_2$, while directing a beam through the tapering rear portion 20. The RF minimum (grazing) angles of 20 degrees are important to prevent reflections of RF energy being transmitted from the antenna 36 from occurring within the fairing 10. The maximum angle for the tapering rear portion 20 is preferably less than about 23 degrees, as indicated by angle $A_5$.

Thus, the selection of the precise curvatures of the frontal portion 16 and the tapering rear portion 20 are important not only for resisting impacts (such as at the leading edge 16 by a bird strike) and preventing flow separation over the tapering rear portion 20, but also for providing the needed minimum RF angles ($A_2$ and $A_3$) to avoid reflections of RF energy within the fairing 10 when the antenna 36 is directing beams at low elevation angles of about 5 degrees.

FIG. 9D illustrates that the curvature of the fairing 10 from fore-to-aft (i.e., left to right in the drawing of FIGS. 3 and 9A), varies continuously with smooth transitions from the frontal portion 16 to the top portion 18, and from the top portion to the tapering rear portion 20. The continuously varying curvature helps to provide a smooth airflow over the fairing 10 and to eliminate the possibility of flow separation occurring at the top and taper rear portions 18 and 20.

Referring to FIG. 9E, a simplified cross section of one half of the fairing 10 can be seen. The lateral (i.e., port to starboard side) radius of curvature $R_2$ when viewing the fairing 10 mounted on the crown of the fuselage 12 of an aircraft is preferably about 240 inches (609 cm). A radius of curvature $R_3$ of an upper corner 22a of the fairing 10 is about 6.1 inches (15.49 cm). A radius of curvature $R_4$ of a lower side edge 22b of the fairing 10 is about 100 inches (254 cm). The lower side edge 22b makes an angle 22c of between about 85-89 degrees with the fuselage 12. It will be appreciated that the opposite lateral side of the fairing 10 is a mirror image of that shown in FIG. 9E. The radius of curvature $R_2$ is selected to avoid structural buckling for airworthiness loads. The upper corner 22a radius $R_3$ is selected to be within about 30%-55% of the height of the fairing 10 to reduce the chance of structural damage to the upper corner 22a in the event of a discrete impact load (e.g., a bird strike), and also to avoid flow separation in side slip maneuvers, and to avoid scattering of the RF wave being transmitted by antenna 36. It will be noted that the lower side edge 22b radius $R_4$ is almost vertical to minimize frontal area 16 drag.

In the embodiment shown in FIGS. 1-5, the fairing 10 is secured at a point on the fuselage 12 that is ideally located on the forward one-third of the fuselage aft of the fuselage nose 12a (i.e., its tangency point on the crown) and forward of the wing 12c (i.e., the wing intersection 12b with the fuselage 12) or just aft of the wing 12c and well forward of the vertical tail 12d. However, it will be appreciated the exact placement of the fairing 10 on the exterior surface of the fuselage 12 may depend on various factors including the overall dimensions of the fairing 10 as well as the specific design of the mobile platform itself, and possibly the type of antenna that is being housed under the fairing 10. For this application to communicate with satellites, the more forward location improves the antenna performance by reducing the vertical tail 12d blockage in the scanned region. Locations near the fuselage nose 12a or the wing 12b require care to avoid high local fuselage Mach numbers greater than the fairing drag rise Mach (Mach 0.9 for this exemplary design).

Figure 10:
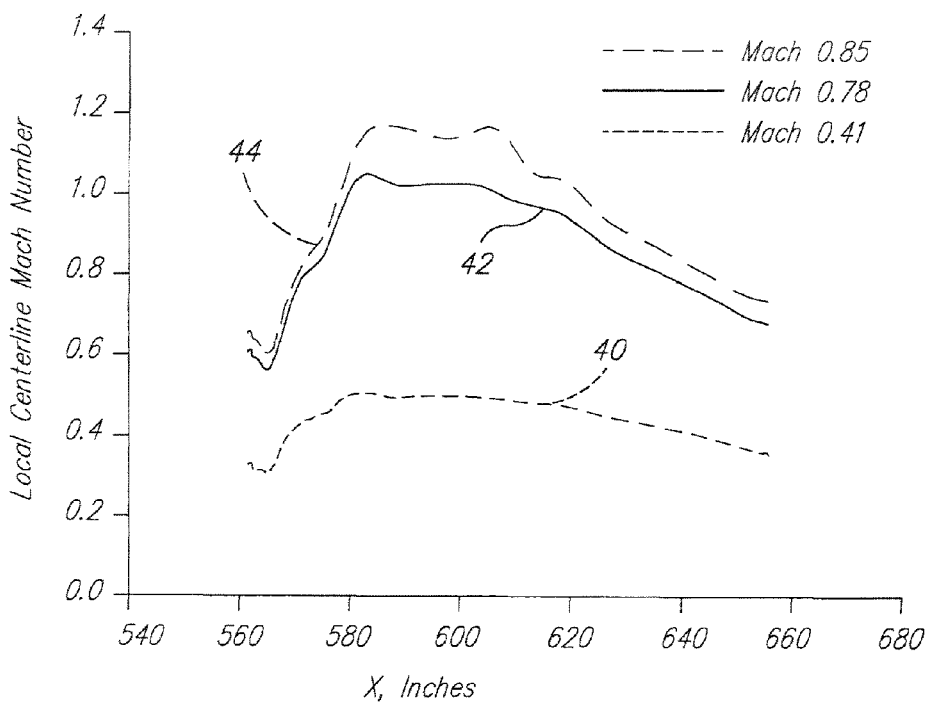
FIG. 10 is a graph illustrating the peak Mach values at various points along the fairing of FIGS. 2-5 at various Mach levels.

FIG. 10 illustrates the peak Mach number profiles for airflow over the fairing 10 when the fairing is moving at a velocity of 0.41 Mach, 0.78 Mach and 0.85 Mach. Curve 40 defines the Mach number profile at 0.41 Mach, curve 42 defines the Mach number profile at 0.78 Mach and curve 44 defines the Mach number profile of air flowing over the fairing 10 with the fairing moving at a velocity of 0.85 Mach. From these three graphs it should be appreciated that the fairing 10 produces low peak Mach number profiles. Put differently, graphs 40-44 indicate that the Mach number of the airflow at the local centerline of the fairing 10 remains very close to the speed of the mobile platform. With the low peak Mach number across the airfoil 10, shocks and flow separation are delayed to speeds above the cruise speed of all modern commercial aircraft. This allows a broad range of applications for the fairing 10 design.

Figure 11:
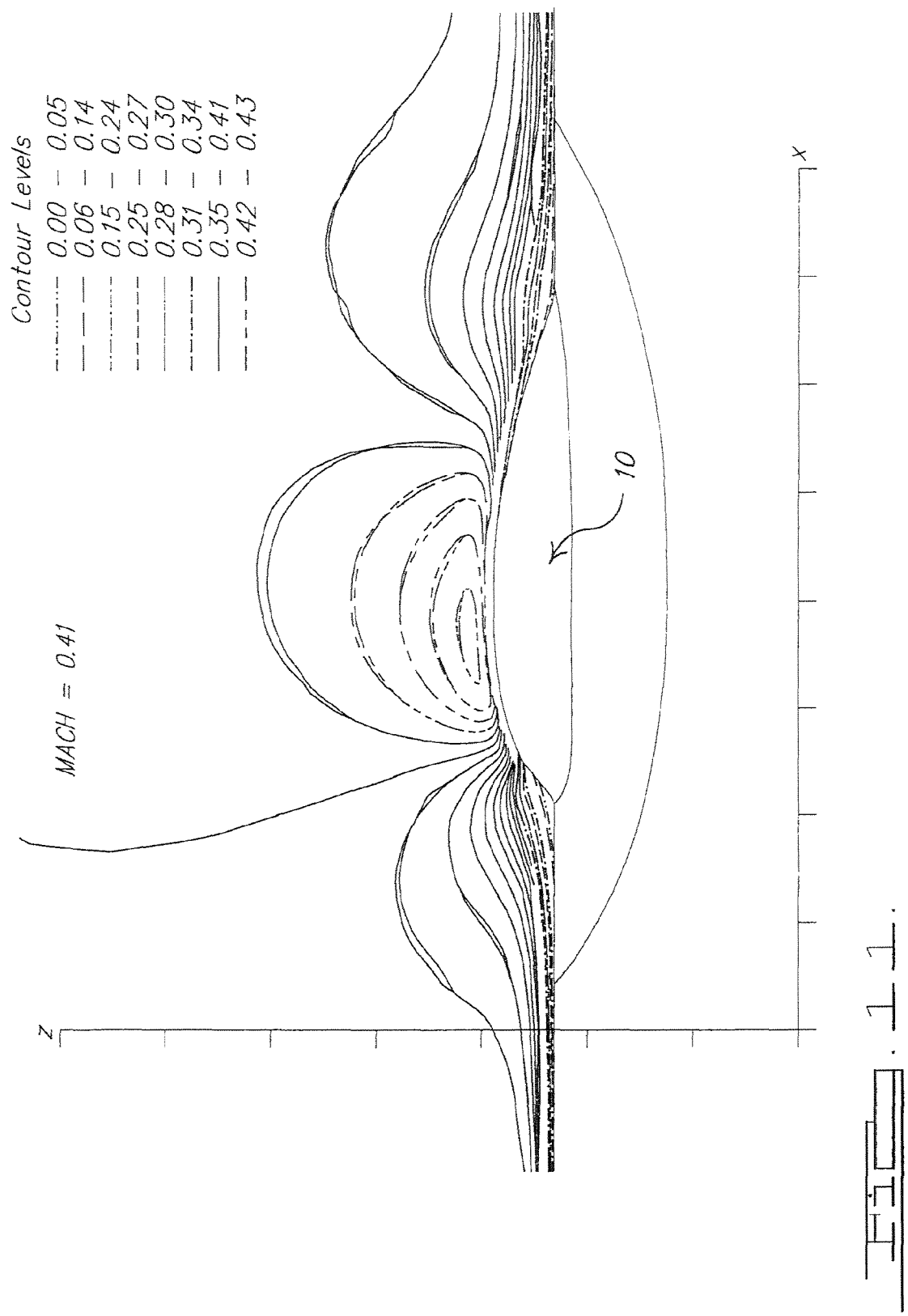
FIG. 11 is a flow field plot illustrating Mach values for airflow over the fairing at 0.41 Mach.
Figure 12:
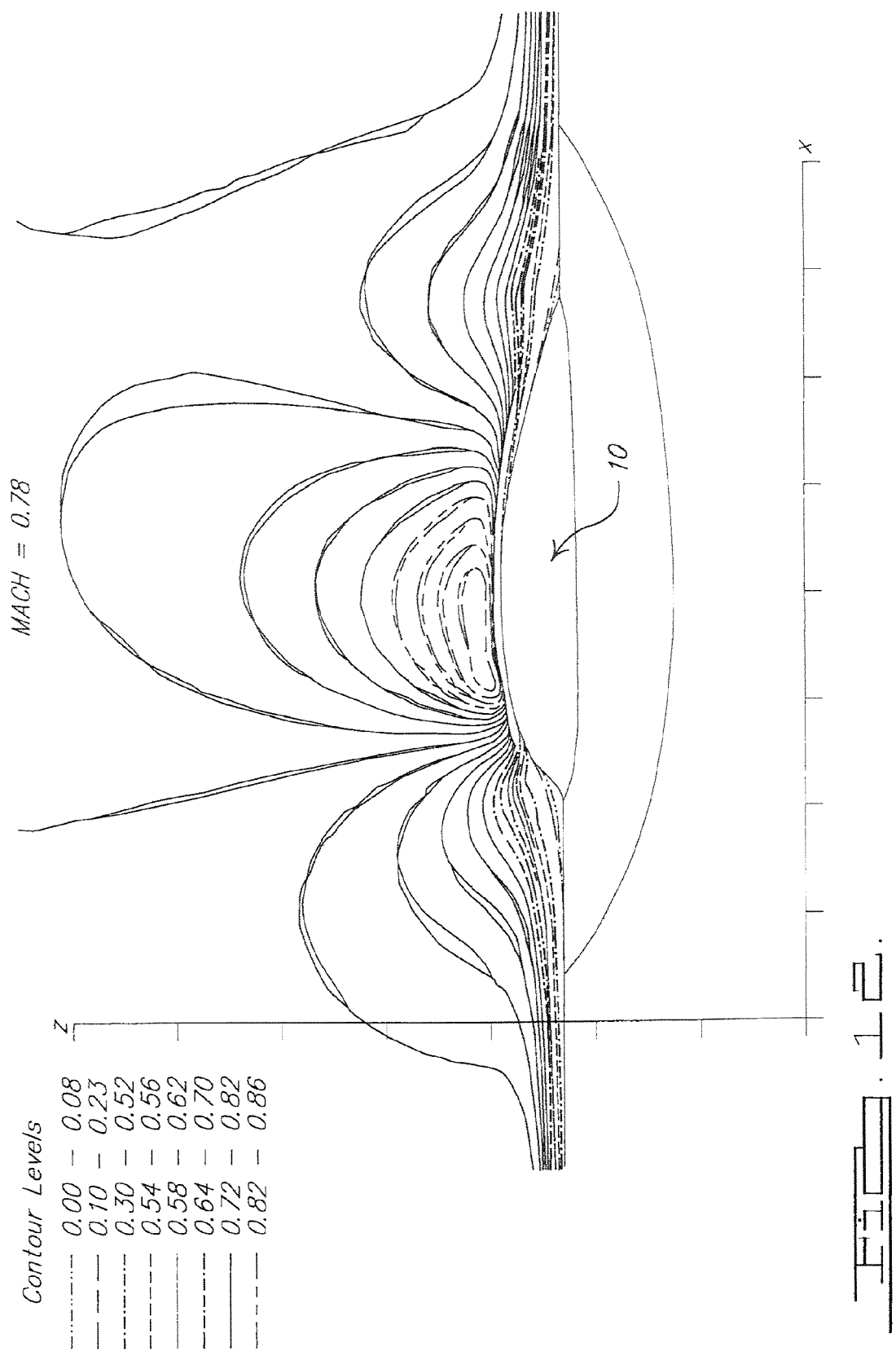
FIG. 12 is a plot illustrating a 0.78 Mach flow field for airflow over the fairing.
Figure 13:
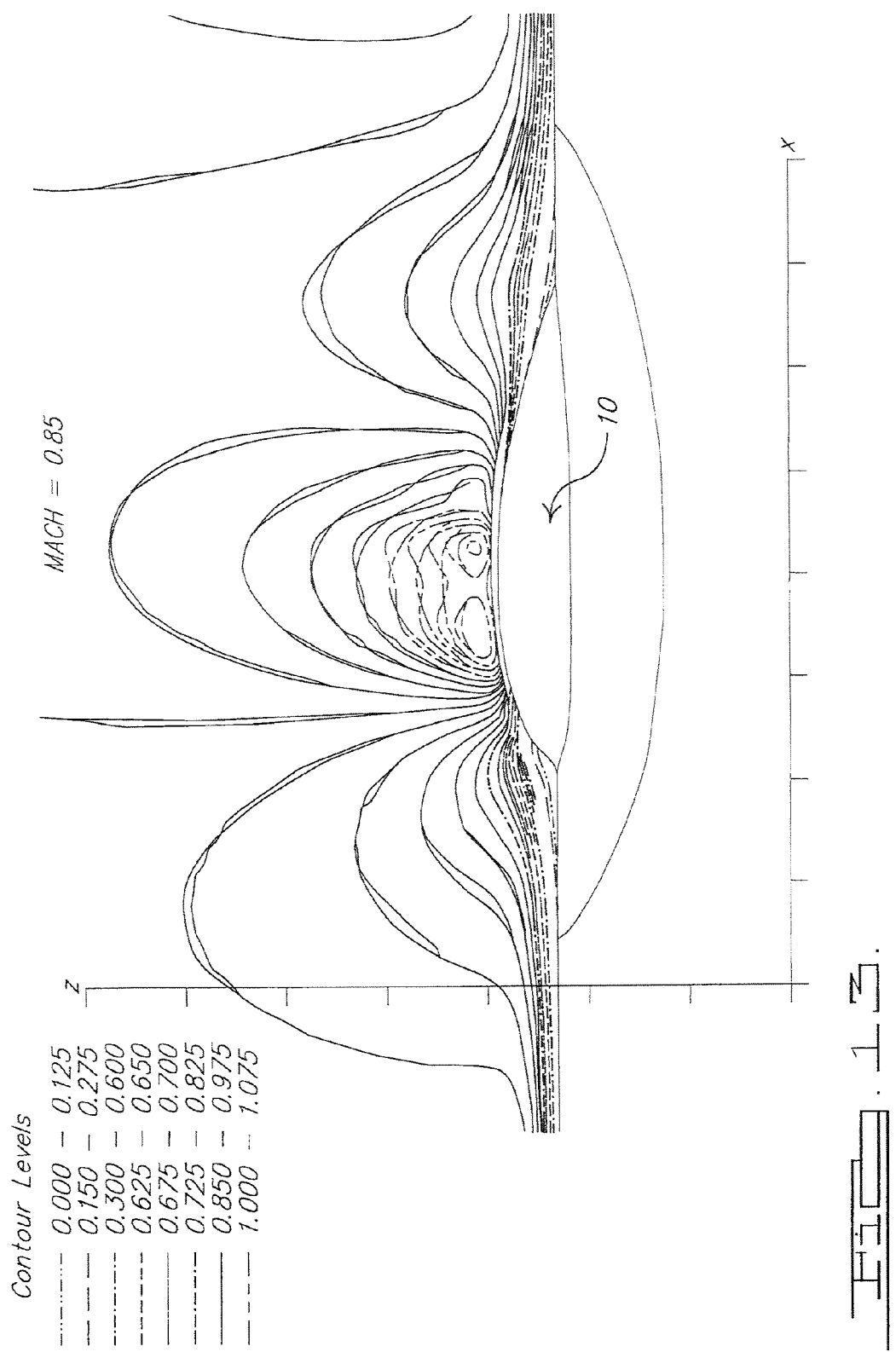
FIG. 13 is a plot illustrating a 0.85 Mach flow field for air flowing over the fairing.

FIGS. 11-13 illustrate the peak Mach values of the airflow over the fairing 10 at speeds of 0.41 Mach, 0.78 Mach and 0.85 Mach, respectively. In particular, FIGS. 11-13 illustrate the local Mach number on the centerline plane of the fairing 10 (as designated by "$C_L$" in FIG. 4). It will be appreciated that the Mach number is the local velocity divided by the speed of sound. The Mach number distribution is nearly flat and uniform across the top portion 18 of the fairing 10 and remains so as the speed increases. This characteristic means that the pressure waves develop uniformly, which avoids the development of shocks and flow separation at high speed. This flow characteristic also keeps the drag low, as can be shown by an optimization computer. The Figures show that low speed flow in the leading edge 16 region and trailing edge region 20 are limited to small areas (subject to separated flow). By minimizing the shocks and flow separation, the aerodynamic noise (that can result in aircraft cabin noise), sonic fatigue loads and vibration level (that impacts fatigue life of the installation) are kept low. However, sufficient curvature is maintained in the profile of the fairing 10 to avoid structural buckling when lightweight material is used. Lightweight material is preferred, and particularly lightweight composite materials that enable excellent radio frequency performance.

Figure 14:
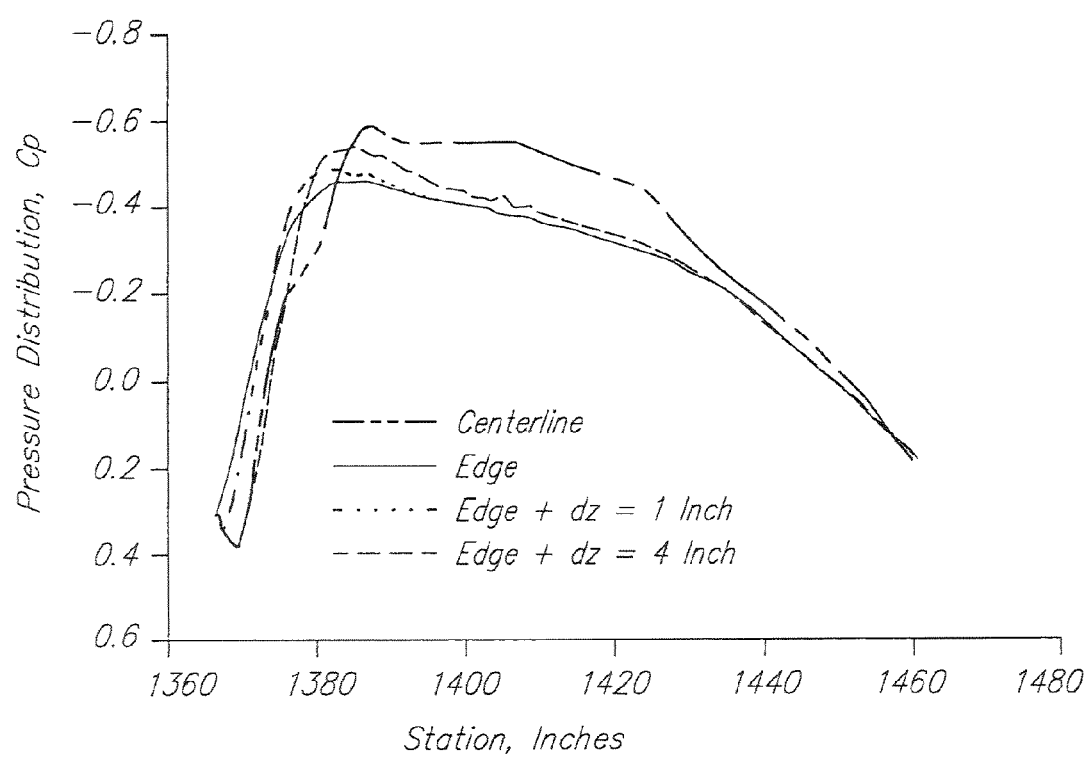
FIG. 14 is a pressure contour graph illustrating the similarity of the pressure contour at the centerline to the buttock line edge of the fairing.

FIG. 14 illustrates a graph of the pressure distribution from the local centerline of the fairing 10 to an edge of the side portion (either 22 or 24), at various points between the local centerline and the outermost edge of the side portion 22 or 24 where the portion insects the fuselage 12 of the mobile platform 14. The uniform pressure distribution is maintained from the centerline to the outboard edge by defining the planform in a manner to allow a common airfoil section. This planform definition provides the desired clearance for the needed antenna swept volume for a rotating antenna. A common airfoil and planform that allows a uniform transition from the centerline to the outboard edge (i.e., the edges adjacent side portions 22 and 24) allows the fairing 10 to maintain good performance across a wide range of flight conditions. Since the pressure profile at the outboard vent location (for vents 30) is similar to the pressure profile on the centerline, properly located vents will equalize the pressure loads across the entire fairing 10. This keeps the normal flight loads low and allows the use of a wide range of material for the fairing 10 design and increases the design life of the installation and internal hardware.

Figure 15:
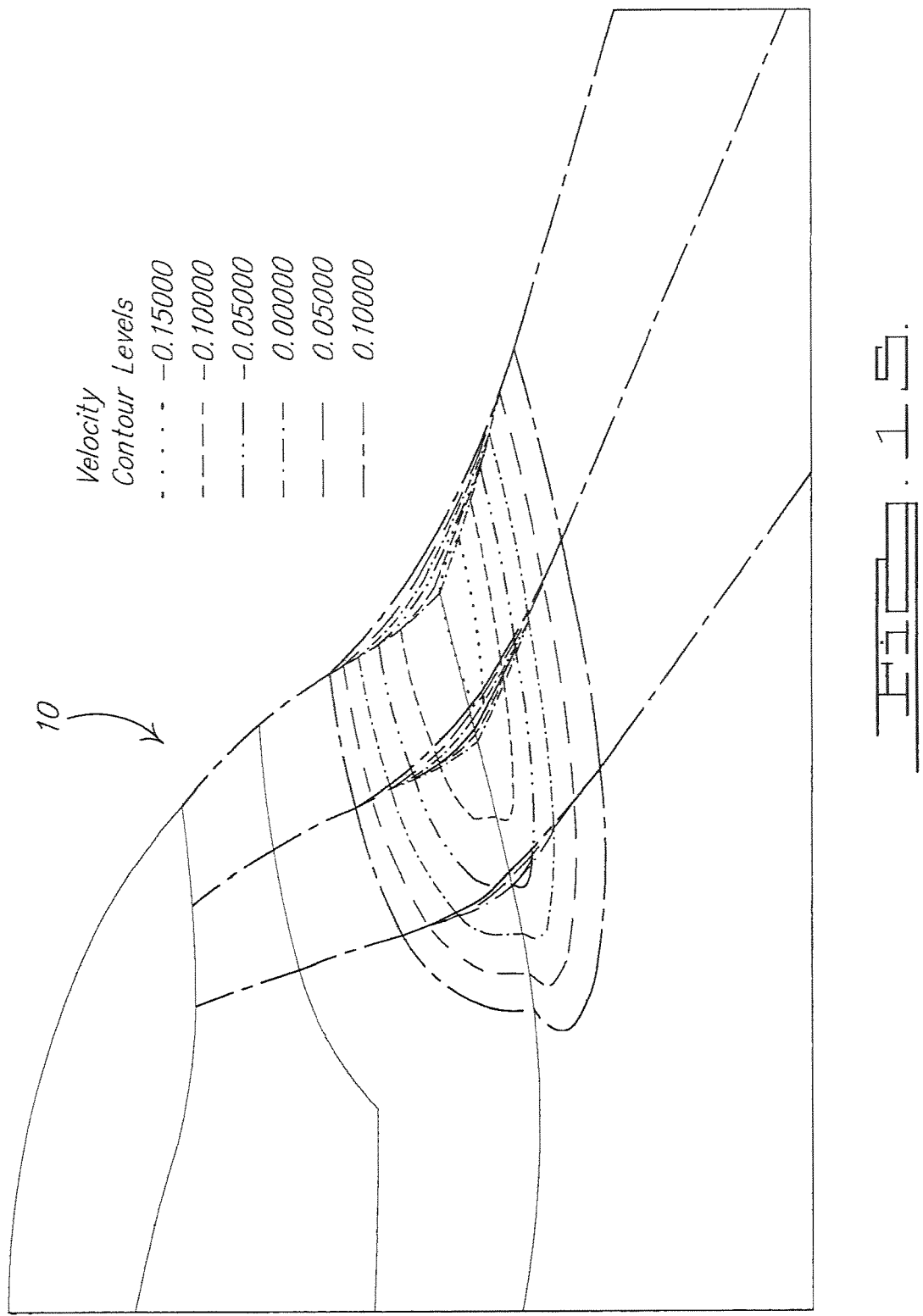
FIG. 15 is a computer generated model of a portion of the fairing illustrating airflow velocity in a recirculation zone at a leading edge of the fairing.

FIG. 15 illustrates in greater detail a portion of the fairing 10 at a leading edge of the front portion 16, and velocity contours for flow in this region. It will be appreciated that when the velocity contour is negative, the flow is upstream. When the velocity is zero, it is the contour line where the flow separates from the surface of the fairing 10.

Figure 16:
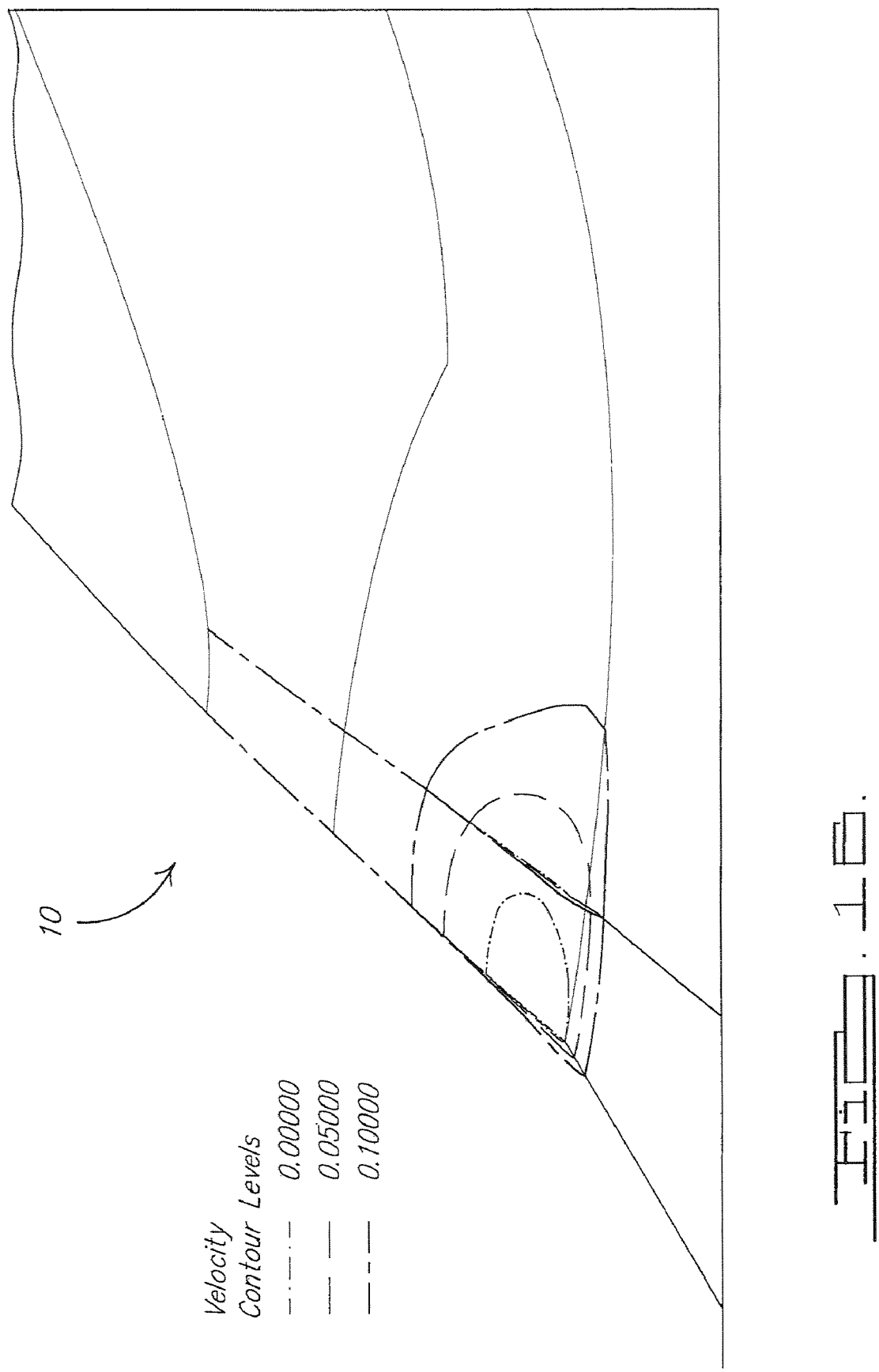
FIG. 16 illustrates a computer generated model of the trailing edge area of the rear portion of the fairing, and the velocity contours at this region.

FIG. 16 illustrates a similar flow characteristic that occurs at a trailing edge region of the tapering rear portion 20 of the fairing 10, but for a different reason. FIG. 16 illustrates normal flow separation where the surface slope becomes too large for the flow to stay attached to the fairing 10. Again, velocity zero represents the boundary and a negative velocity represents upstream flow. A design objective is to maintain these regions (shown in FIGS. 15 and 16) small by the design of the fairing 10 and airfoil 32 shape.

Figure 17:
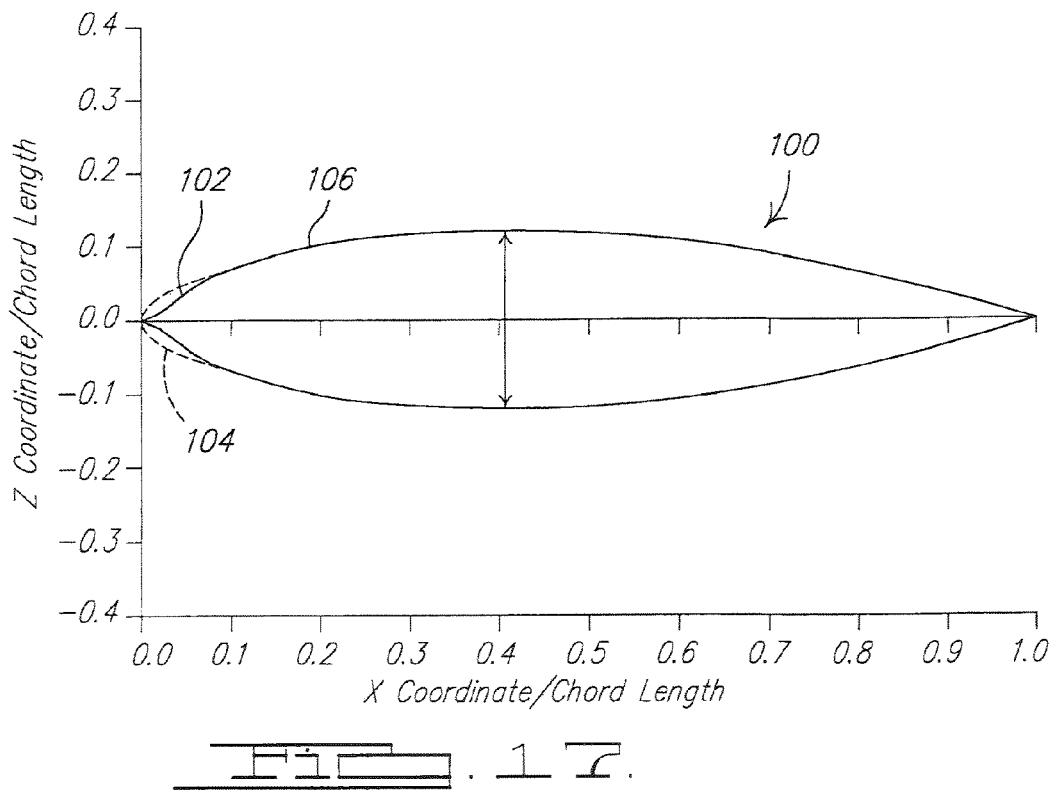
FIG. 17 illustrates a complete airfoil formed in accordance with the curvature of the airfoil of FIG. 6.

FIG. 17 illustrates a complete airfoil 100 in profile along a longitudinal centerline thereof. The airfoil 100 is essentially identical to the airfoil 32 of FIG. 6 but with a mirror image lower half portion included. Although shown in solid lines with a fillet 102, dashed lines 104 at a leading edge area 106 indicate that a bull nose leading edge portion could just as readily be incorporated. The fillet 102 has been found to reduce the stagnation recirculation region. Optionally, adding a fillet ahead of the bullnose (indicated by dashed lines 104) can eliminate the stagnation region altogether, although at the expense of increasing the overall length of the airfoil 100 slightly (i.e., by about 10%).

Figure 18:
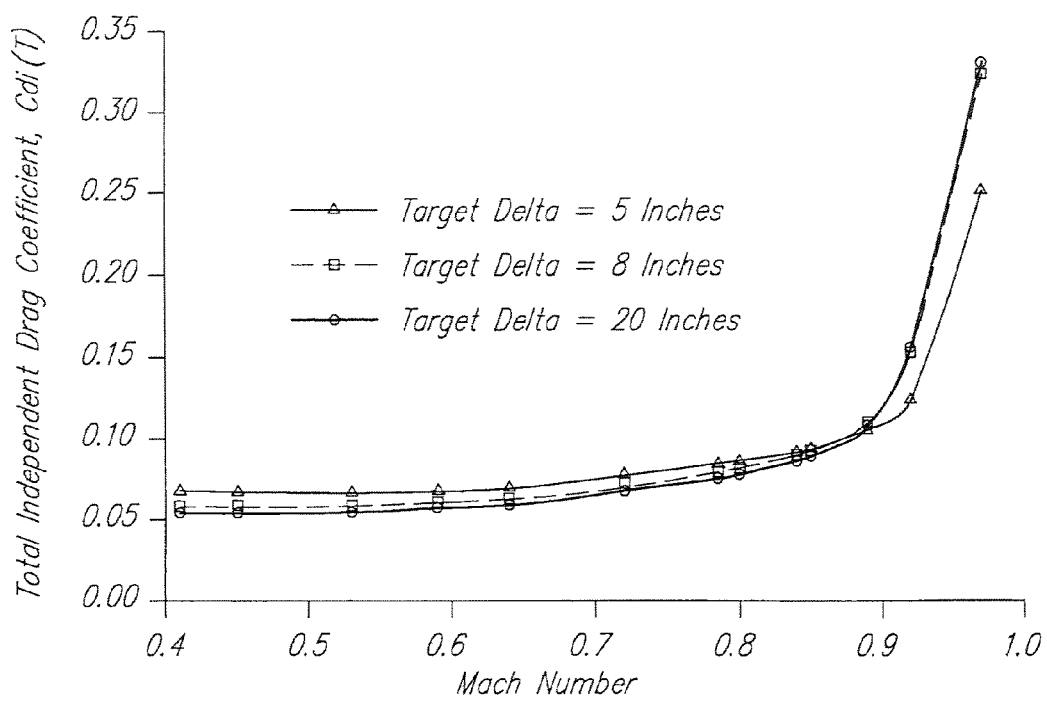
FIG. 18 is a graph of the drag rise for the airfoil of FIG. 17 at various aircraft local Mach numbers.

It was also desired to provide sufficient curvature over the center portion of the fairing 10 and the airfoil 100 to avoid any structural problems. High normal loads (normal to the fairing 10 surface) can be induced on the fairing 10 by the aircraft local flow field or failure events, e.g., decompression of the cabin air into the fairing or emergency descent under icing conditions. Curved surfaces provide additional strength to the structure allowing the use of lightweight material required for good RF performance. However, increased curvature results in higher peak Mach numbers. It is highly desirable to keep the peak Mach low enough to avoid a shock at the maximum cruise Mach speed. The shock causes flow separation, increases drag and vibration. FIG. 18 illustrates that the airfoil 100 and fairing 10 perform to maintain the drag rise (a result of shocks) above 0.9 for the aircraft local Mach number. Aircraft are required to have no perceptible buffet or vibration up to the maximum operating mach number for the aircraft. By designing the fairing 10 to avoid shocks and any significant flow separation for local mach numbers up to 0.9 (well above maximum cruise mach (0.85) for modern aircraft) the probability of perceptible buffet or vibration is eliminated. In addition for normal cruise, the absence of any significant vibration for the majority of the flight time will avoid structural fatigue damage and increase the fairing 10 and attachment hardware life limits and structural inspection intervals. This design approach also enhances the probability that the fairing 10 will perform as well as other aircraft component, i.e., wing and tail surfaces, at the aircraft maximum design (demonstrated flight) flight speed, which can be up to mach 0.97.

Figure 19:
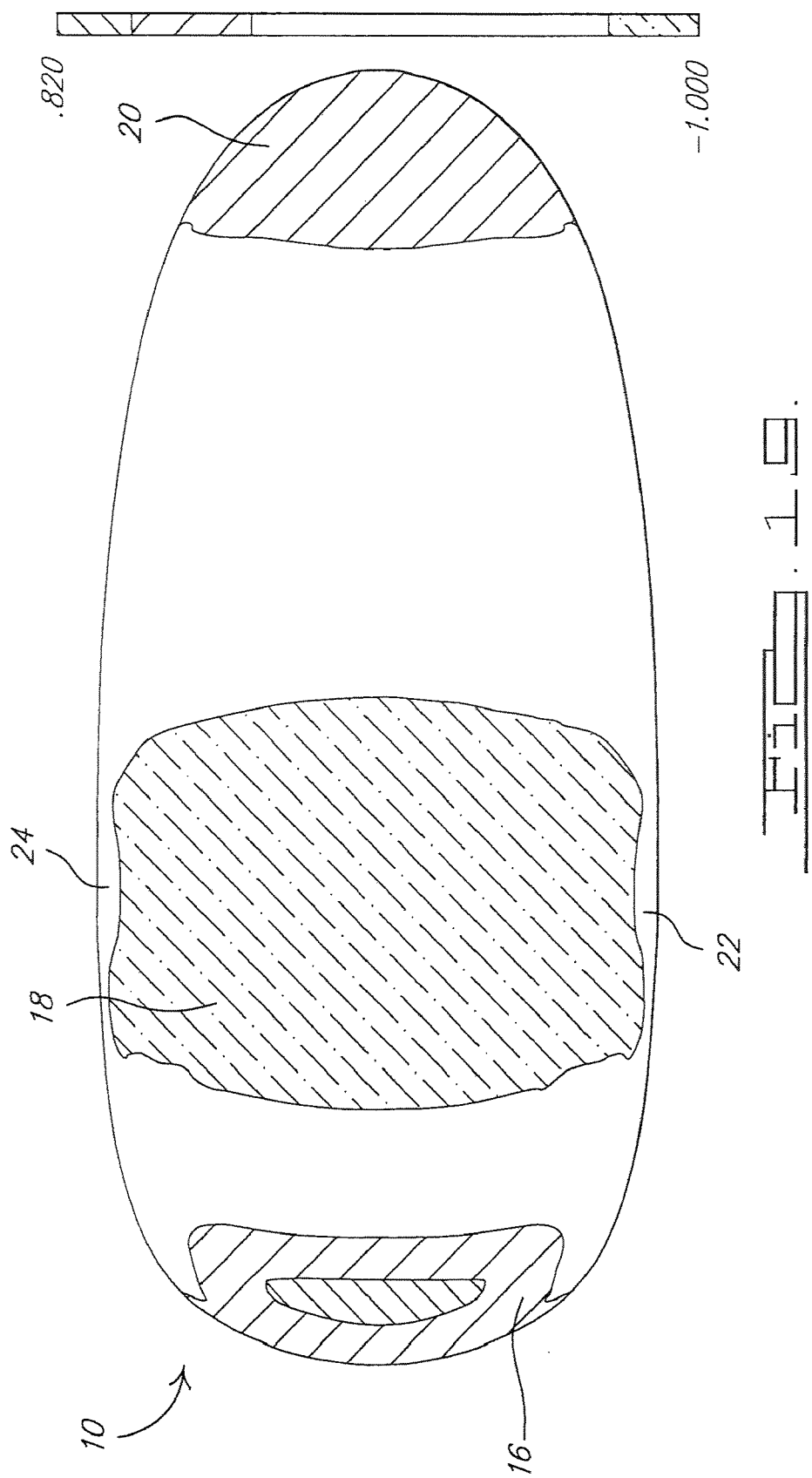
FIG. 19 is a graph of the uniform pressure load over the airfoil.

FIG. 19 illustrates the uniform pressure flow distribution over the fairing 10 from a longitudinal centerline of the fairing 10 to its outboard side portions 22 and 24. The term "Cp" indicates pressure coefficient. The Cp range is from −1 to +0.8 where Cp=(delta static pressure)/(dynamic pressure). "Dynamic pressure" can be defined as follows:

Dynamic pressure=0.5×density×velocity² where the density is the air density at the flight altitude and velocity is the velocity of the aircraft.

"Delta static pressure" is the net of the external pressure minus the internal pressure on the fairing 10. FIG. 19 highlights the uniform pressure distribution from the longitudinal centerline of the fairing 10 to the outboard edges. Using a single airfoil for the fairing 10 provides a uniform variation in pressure as you go outboard toward the side portions 22,24, and a similar profile for the pressure distribution. Thus, the pressure at the longitudinal centerline and the outboard edges (i.e., side portions 22,24) are similar. In addition, the pressure at the vent locations 30 (FIG. 4) is close to the pressures across the fairing (inboard to outboard) and the resulting internal pressure (equal to the vent pressure) will minimize the fairing loads for normal flight (i.e., the internal pressure load more closely balances the external pressure load).

It will also be appreciated that the above-described flow performance characteristics of the airfoil 100 will be similar or essentially identical to that of the fairing 10. Thus, the graphs used in connection with the description of the airflow performance of the fairing 10 will be understood to apply to the airfoil 100 as well.

The fairing 10 thus avoids low grazing angles for an antenna beam. The fairing 10, however, still provides sufficient clearance to mount an antenna thereunder. Sufficient curvature is also provided on a top portion of the fairing 10 to avoid structural buckling under high loads, but not so much curvature that would result in a high crown Mach number. The fairing 10 and airfoil 100 are further both usable at high aircraft cruise Mach numbers (i.e., 0.85 Mach), aircraft maximum operating Mach numbers up to, or possibly exceeding, 0.92 Mach, and aircraft maximum design (demonstrated flight) mach numbers up to, or possibly exceeding, 0.97. The fairing 10 and airfoil 100 each minimize flow separation, minimize incremental drag, and each is scaleable in its thickness ratio to maintain uniform inboard to outboard pressure distribution thereover.

The fairing 10 provides a means for enclosing a relatively large component on an exterior surface of a mobile platform, and most advantageously on a mobile platform adapted to travel at high speeds, in a manner that significantly reduces or essentially eliminates the negative aerodynamic consequences that would otherwise be created by the component. Importantly, fairing 10 utilizes an airfoil shape that maintains the peak local Mach number at various portions over the fairing 10 low to avoid shocks that could otherwise be created by local Mach numbers greater than about 1.2 in magnitude. The fairing 10 and the airfoil 100 each further provide very low aerodynamic drag. The fairing 10 further does not negatively impact the performance of the aircraft (or other form of mobile platform) on which it is installed, or otherwise complicate construction of the mobile platform itself. The fairing 10 and the airfoil 100 are each lightweight and readily adaptable and scalable to a wide range of mobile platforms to cover a wide range of applications. The fairing 10 is scalable to cover a wide range of antenna components that are mounted on an exterior surface of the mobile platform.

Still another advantage of the fairing 10 is the overall contours of the fairing produce very good radio frequency (RF) incidence angles. By this it is meant that when the fairing 10 is used to enclose an antenna that is transmitting information or data, the contours of the fairing 10 significantly reduce the distortion or refraction of the electromagnetic beam caused by the internal surface of the fairing 10. These effects on the electromagnetic beam cause beam scattering and reduce the operating efficiency of the antenna or can result in failure to meet regulatory requirements.

While various exemplary embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. An airfoil for use on a high speed, jet powered airborne mobile platform, and secured to an exterior surface of said mobile platform at a location so as to be disposed within a boundary layer during flight of the mobile platform, the airfoil comprising:
    a chord length designated by X;
    a chord thickness at a local center line representing a thickness designated by Z;
    wherein one-half of a thickness (Z) of said chord forms a ratio (Z/X) approximately within a range of about 11-13%; and
    said airfoil producing a peak Mach number for airflow over a longitudinal centerline of said airfoil that is no greater than about Mach 1.2 when said mobile platform is moving at a speed of about Mach 0.85 with a relative constant Mach number flow over a region defined as at least an approximate 20% length of maximum thickness of said airfoil;
    said airfoil further having a drag coefficient that is relatively constant and less than a value of about 0.10 up to an airspeed of about Mach 0.9;
    said airfoil further having a pressure distribution (Cp) that is positive at a trailing edge; and
    said airfoil further having a frontal portion forming an angle at a half height point thereof of between about 20 degrees to about 32 degrees relative to the exterior surface of the mobile platform.

2. The airfoil of claim 1, wherein said ratio comprises a ratio of about 12%.

3. The airfoil of claim 1, wherein said frontal portion comprises a frontal area of at least approximately three square feet.

4. The airfoil of claim 1, wherein the airfoil comprises a top portion and a tapering rear portion, and wherein said top portion and said tapering rear portion have a radius of curvature of about 130 inches.

5. The airfoil of claim 4, wherein a maximum angle for the tapering rear portion is less than about 23 degrees.

6. The airfoil of claim 1, wherein said airfoil includes upper corner portions each having a radius of curvature of about 6 inches.

7. The airfoil of claim 1, wherein the airfoil produces an aerodynamic drag of no more than about 50 pounds when said mobile platform is traveling at an airspeed of about 0.80-0.90 mach.

8. The airfoil of claim 1, wherein the airfoil generates no more than about 50 pounds of drag at about 0.85 Mach.

9. The airfoil of claim 1, wherein said chord length comprises a length of between about 90-100 inches (228.6-254 cm).

10. The airfoil of claim 1, wherein said chord thickness (Z) comprises a maximum half thickness at said local centerline of about 12 inches (30.48 cm).

11. The airfoil of claim 1, wherein said frontal portion includes a fillet.

12. The airfoil of claim 1, wherein said frontal portion generally comprises a bull nose shape.

13. An airfoil on a high speed jet aircraft, secured to an exterior surface of said aircraft at a location so as to be within a boundary layer while the aircraft is in flight, the airfoil comprising:
  a chord length designated by X;
  a chord thickness at a local center line representing a thickness designated by Z; and
  wherein one-half of a thickness (Z) of said chord forms a ratio (Z/X) approximately within a range of about 11-13%;
  wherein said airfoil includes a frontal portion, said frontal portion including a fillet and a generally bull nose shape;
  said airfoil producing a peak Mach number for airflow over a longitudinal centerline of said airfoil of no more than about 1.2 over an operating speed of about Mach 0.41-Mach 0.85, with a relatively constant Mach number for airflow over a region defining the thickest 20% of said airfoil, and with no abrupt change from supersonic to subsonic flow that would result in formation of a shock wave;
  said airfoil further having a drag coefficient that is relatively constant and less than a value of about 0.10 up to an airspeed of about Mach 0.9;
  said airfoil further having a tapering rear portion and a pressure distribution (Cp) that is positive at said tapering rear portion;
  said frontal portion forming a leading edge surface for the airfoil, said frontal portion forming an angle at a half height point thereof between about 30 degrees to about 31 degrees; and
  said top portion and said tapering rear portion forming a radius of curvature that is between about 125 inches-135 inches.

14. The airfoil of claim 13, wherein said frontal portion includes a pair of fillets on opposite sides of a longitudinal centerline extending through a midpoint of said chord thickness.

15. The airfoil of claim 13, wherein said airfoil generates peak local Mach numbers of no more than about 1.2 over its entire surface while said aircraft travels at a speed between about Mach 0.41-Mach 0.85.

16. The airfoil of claim 13, wherein the airfoil produces no more than about 50 pounds of drag at an airspeed of about 0.85 Mach.

17. An airfoil on a high speed jet aircraft, secured to an exterior surface of said aircraft at a location so as to be within a boundary layer while the aircraft is in flight, the airfoil comprising:
  a chord length designated by X;
  a chord thickness at a local center line representing a thickness designated by Z; and
  wherein one-half of a thickness (Z) of said chord forms a ratio (Z/X) approximately within a range of about 11-13%;
  wherein said airfoil includes a frontal portion, said frontal portion including a fillet and a generally bull nose shape;
  said airfoil producing a peak Mach number for airflow over a longitudinal centerline of said airflow of no more than about 1.2 over an operating speed of about Mach 0.41-Mach 0.85, with a relatively constant Mach number for airflow over a region defining the thickest 20% of said airfoil, and with no abrupt change from supersonic to subsonic flow that would result in formation of a shock wave;
  said airfoil further having a drag coefficient that is relatively constant and less than a value of about 0.10 up to an airspeed of about Mach 0.9;
  said airfoil further having a tapering rear portion and a pressure distribution (Cp) that is positive at said tapering rear portion;
  said frontal portion forming a leading edge surface for the airfoil, said frontal portion forming an angle at a half height point thereof between about 30 degrees to about 31 degrees; and
  said top portion and said tapering rear portion forming a radius of curvature that is between about 125 inches-135 inches.

18. The airfoil of claim 17, wherein the airfoil is formed with said chord length (X) comprising a length of between about 90-100 inches (228.6-254 cm).

19. The airfoil of claim 17, wherein the airfoil is formed with said chord half thickness (Z) comprising a thickness of about 12 inches (60.96 cm).

* * * * *